United States Patent [19]

Haymore et al.

[11] Patent Number: 4,624,787

[45] Date of Patent: * Nov. 25, 1986

[54] LIFTING MECHANISM FOR SEDIMENTATION DEVICE

[75] Inventors: Ralph B. Haymore; Heinz W. Winter, both of Salt Lake City, Utah

[73] Assignee: Envirotech Corporation, Menlo Park, Calif.

[ * ] Notice: The portion of the term of this patent subsequent to May 7, 2002 has been disclaimed.

[21] Appl. No.: 731,172

[22] Filed: May 6, 1985

Related U.S. Application Data

[63] Continuation-in-part of Ser. No. 490,741, May 2, 1983, Pat. No. 4,515,694.

[51] Int. Cl.⁴ ............................................. B01B 21/18
[52] U.S. Cl. ..................................................... 210/531
[58] Field of Search .............. 210/525, 529, 530, 531; 212/201; 254/384, 385

[56] References Cited

U.S. PATENT DOCUMENTS

| | | | |
|---|---|---|---|
| 2,368,703 | 2/1945 | Bousman | 210/531 |
| 3,679,063 | 7/1972 | Pate | 210/531 |
| 4,137,170 | 1/1979 | Tateishi | 210/530 |
| 4,424,130 | 1/1984 | King | 210/531 |

Primary Examiner—John Adee
Attorney, Agent, or Firm—Carl A. Rowold

[57] ABSTRACT

A lifting mechanism for a raking structure in a solids-liquid separation tank comprising a fixed column adapted to extend vertically within the tank, a movable column being adapted to support a raking structure for the tank, and a lift device for raising and lowering said movable column telescopically with respect to said fixed column. The lift device includes an elongate flexible tension member; a first series of load points on the fixed column at spaced intervals on the fixed column; and a second series of lift points on the movable column below said first series of points and at spaced intervals on the movable column, the tension member being alternately threaded between load and lift points of said first and second series of points, with the tension member thus being led over one of said load points, down and below one of said lift points and back up and over the next load point. A power driven drum is provided means for selectively pulling and paying out said tension member for drawing the lift points up toward the load points for raising the movable column, and for allowing the lift points to move down away from the load points for lowering the movable column, respectively.

10 Claims, 8 Drawing Figures

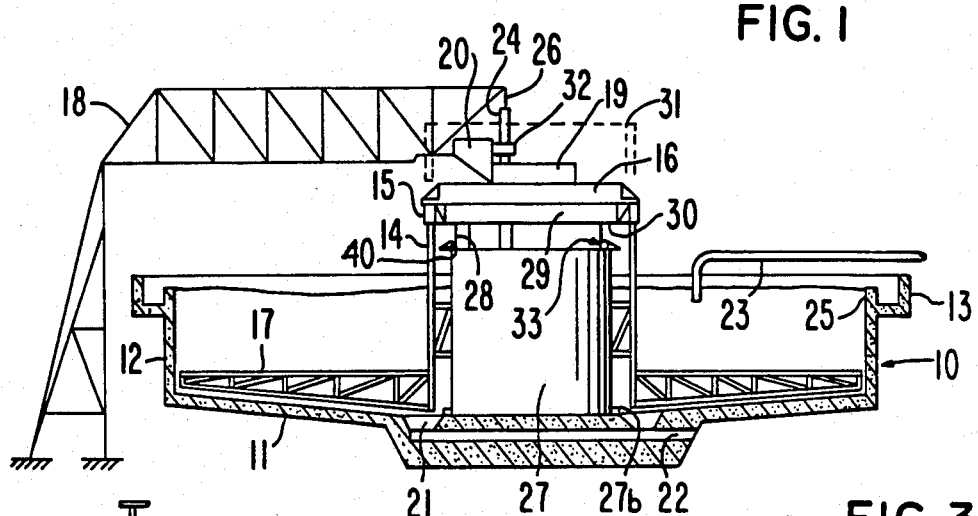
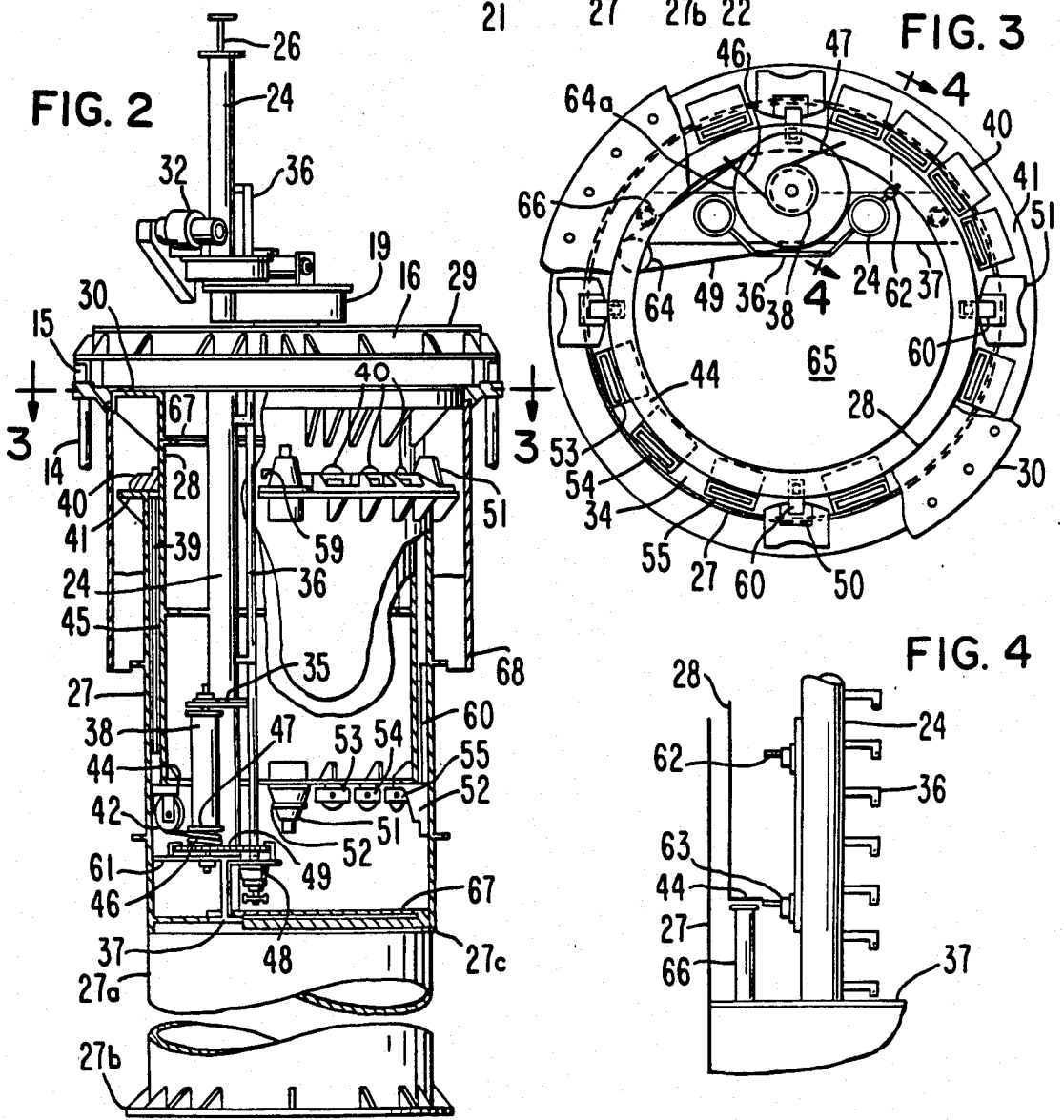

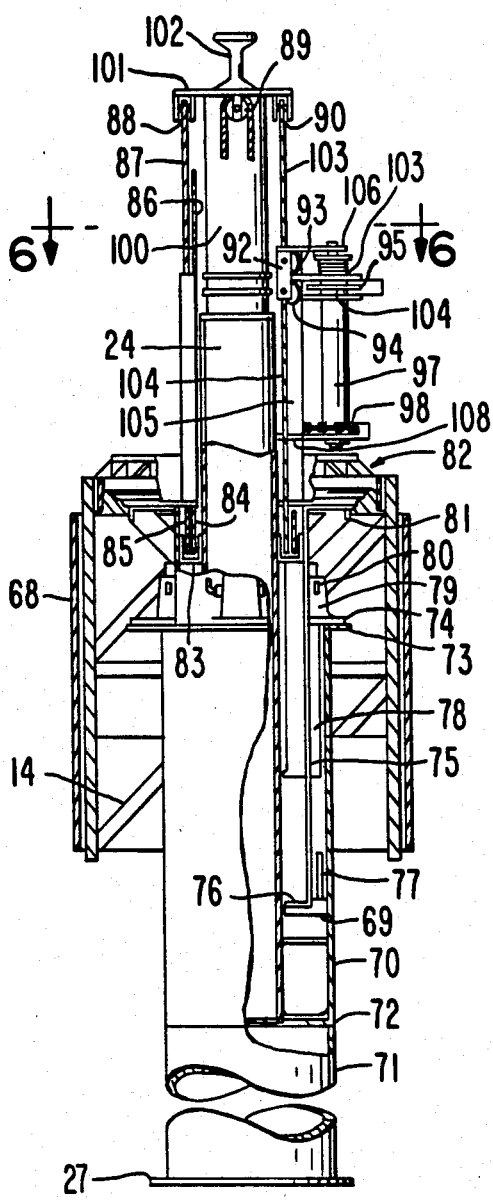
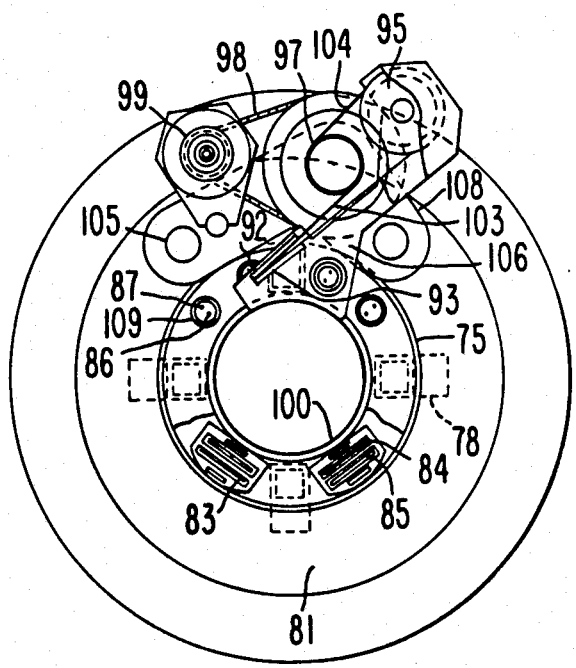
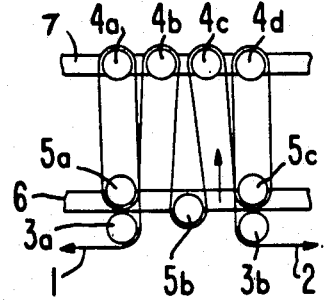
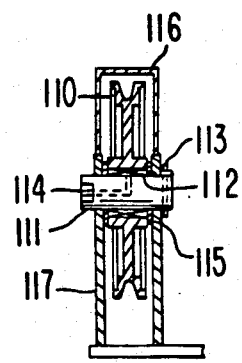

LIFTING MECHANISM FOR SEDIMENTATION DEVICE

Related Applications

This application is a continuation-in-part of application Ser. No. 490,741, filed May 2, 1983, U.S. Pat. No. 4,515,694.

BACKGROUND OF THE INVENTION

This invention relates to lifting mechanisms employed in solids-liquid sedimentation apparatus to raise and lower rotatable rake arms which engage settled solids within the tank and move the solids to a tank bottom outlet. More particularly, it provides a power driven device to lift the rake drive unit with attached rakes above its normal operating position when it is desired to limit the torque applied to such unit and rakes.

Solids-liquid sedimentation apparatus which includes thickeners, clarifiers and the like employ a torque tube or shaft or a motor-driven ring gear or drivehead for driving one or more rake structures contained at a lower level within the sedimentation tank. In normal typical operations the rake(s) with associated blades move settled solids along a slightly conical bottom surface of the tank toward a central outlet where the settled solids are removed by gravity or pumping. A relatively high torque is imposed by the drive means during normal operation, but when an abnormal mass of sediment or an obstruction is encountered, the torque needed to drive the rake structure may be beyond the capability of the drive or the strength of the rake structure. When such an event occurs it is necessary to move the rake structure upwardly so its movement is not impeded by the heavy sediments or obstruction. This is normally done automatically in response to a torque sensor. Further, if power is lost or if it is necessary to shut down the rotation of the rakes for any reason, it is necessary to raise the rake structure above the resulting sediment layer so that the rakes are not "frozen" or "locked-in" the settled solids necessitating digging the solids out from around the rakes.

A relatively simple form of lift device is seen in U.S. Pat. No. 2,724,506 which includes lifting screw attached to a torque shaft which automatically raises the rakes by a camming action to a higher level where the rakes are no longer obstructed. The rakes may also be raised by rotation of the screw by a manually-operated hand wheel. U.S. Pat. No. 2,122,287 shows a similar hand-operated wheel for moving rakes upwardly The Bousman U.S. Pat. No. 2,727,628 shows a center column sedimentation device with a rotatable concentric cage therearound, supporting the rake structure. Raynor et al. U.S. Pat. No. 3,200,956 also shows a telescoping column lift device. Bousman U.S. Pat. No. 2,368,703 shows sedimentation apparatus including pulleys secured to the rake arms with cables extending from a rake blade through the pulleys to a winch for lowering or raising the arms. A similar pulley-cable-winch mechanism is utilized for raising an included cone scraper frame. U.S. Pat. No. 3,592,447 shows a pully-cable-winch arrangement which raises or lowers a grain levelling apparatus from a fixed ceiling point At the present time most commercial sedimentation devices utilize one or more jack screws, rotation of which provides relative movement between a center column and a rake-supporting moving column. Such jack-screw devices have large load concentrations on the jack screw(s) and necessitate equalization of loadings and rotational moments on each screw. Much space is taken up in the center column with the multiple screws and drives and the required bridge and walkway support columns. Further, jack screws inherently have low lift efficiencies of the order of 8-20%.

SUMMARY OF THE INVENTION

The lifitng mechanism of this invention comprises a fixed column adapted to extend vertically within the tank, a movable column in telescoping relationship with said fixed column, said movable column being adapted to support a raking structure for the tank, and means for raising and lowering said movable column telescopically with respect to said fixed column. This means includes an elongate flexible tension member, such as a cable, a first series of load points, such as sheave means, on the fixed column at spaced intervals on the fixed column, and a second series of lift points, such as sheave means, on the movable column below said first series of points and at spaced intervals on the movable column, with the tenion member being alternately threaded between load and lift points of said first and second series of points. The tension member is thus led over one of said load points, down and below one of said points and back up and over the next load point. Means, such as drum means, is provided for selectively pulling and paying out said tension member for drawing the lift points up toward the load points for raising the movable column, and for allowing the lift points to move down away from the load points for lowering the movable column, respectively.

This invention provides for uniform load pickup around the column circumference from one common pulling poing, thus equalizing load sharing and obviating any problem of timing the rotational movement of multiple independent raising devices such as jack screws. The drun is preferably vertically oriented and positioned so that as the sheave means attached to the moving column moves vertically due to cable pull and shortening of the space between the series of sheaves, the rotating driven drum pulls the cable so both ends of the cable are laid in parallelism on the drum surface without any cable angle side pull or necessity of cable grooves on the drum surface. The cable angular approach on to the drum is the same through the complete vertical lift with each end of the cable being wound in juxtaposed side-by-side parallelism; i.e., in raising, the cable-feeding sheaves and the drum surface continually move relative to each other to a higher position where there is a cable-free surface on the drum. The cable-sheave-drum system has a lifting efficiency of from 70-80%. The system is very cost-effective being a simple mechanism with rather loose tolerance requirements which can quickly and dependably raise large heavy structures. For example, a 160-foot diameter thickener having a 12-foot fixed center column when employing a 5.0 lift horsepower can lift approximately a gross weight of 500,000 pounds in rake and support structure at approximately 1 inch per minute.

BRIEF DESCRIPTION OF THE DRAWINGS

FIG. 1 is a partial cutaway cross-sectional side view of a sedimentation tank incorporating the present invention.

FIG. 2 is a partially cutaway side view of the cable lifting mechanism.

FIG. 3 is a partially cutaway top view of the mechanism on line 3—3 in FIG. 2.

FIG. 4 is a sectional side view of the mechanism on line 4—4 of FIG. 3.

FIG. 5 is a partially cutaway side view of a second embodiment of the lifting mechanism.

FIG. 6 is a partially cutaway top view of the lift device taken on line 6—6 of FIG. 5.

FIG. 7 is a detailed end view of a sheave assembly of the lift device.

FIG. 8 is a schematic view of the lift device of FIGS. 2 and 3.

DETAILED DESCRIPTION

The apparatus of FIG. 1 involves a sedimentation device which may function in its normal manner as a liquids-solid separator either as a thickener where thickened solids are the desired product, as for example in minerals processing applications, or as a clarifier where clarified overflow is desired as in the waste water treatment field. The device includes a conventional cylindrical tank 10 having a flat inwardly inclined floor 11, a vertical side wall 12, a peripheral overflow through or launder 13, a drive cage or torque tube 14 connected by an adapter ring 15 to a ring drive gear 16. Torque tube or cage 14 is connected at its bottom end to the inner periphery or rake support arms 17. A support bridge 18 is attached by crossbeam 26 to a column support 24 extending downwardly into a fixed center column 27. A movable column 28 telescopically extends downwardly within column 27. A support housing 29 is mounted on a top outwardly-extending flange 30 on column 28. Drive ring gear 16 and supporting bearing are mounted in housing 29. Ring gear 16 is driven by gear box 19 by a motor 32 through a gear reducer 20.

In operation the tank 10 is filled through feed pipe line 23 with a liquid containing suspended solid particles to a level equal to the height of a peripheral circular weir 25. The tank unit acts as a settling basin with solids falling to the tank bottom floor where they are raked by radially-extending conventional rake blades (not shown) into an annular sludge pocket 21 from where they are pumped or otherwise removed through sludge removal pipe 22. Clarified liquid overflows weir 25 into launder 13 and is removed by suitable piping (not shown). The rake assembly 17 and torque case 14 are driven by ring gear 16 through an adapter ring 15. The hereafter described lifting mechamism 33 lifts the rake assembly 17 when it is overloaded due to accumulated solids, when it encounters an obstruction or otherwise when it is desired that the rakes be lifted. Upon activation, column 28 raises along with its associated drive housing 29, including the ring gear 16 and its drive unit 19, 20, 21, to the dotted line position 31. The attached torque cage 14 and rake arms 17 are simultaneously raised. Four keys and keyslots at the top location are welded to telescoping column 28 and to the top flange of fixed column 27. respectively. Four keys and keyslots at a bottom location are welded to the fixed column 27 and to the lower flange of the telescoping column 28, respectively. The keys and keyslots form a spline which restrains the telescoping column torsionally and laterally yet allows axial movement. The vertical distance of movement of flange 30, nominally 36 inches, is the lift height (L.H.) of the device. Crossbeam 26 on the top of support column 24 functions to give central support to fixed bridge 18.

FIG. 2 shows a cutaway view of a lifting device which is particularly usable with respect to large lifting devices. The term "large" in this context is used with respect to thickeners having a diameter of 100 to 250 feet or more. These devices employ a lifting horsepower of from 2 to about 5 HP and can lift from 300,000 to 500,000 pounds. In a 120-foot diameter device, the fixed column has a diameter of 8 feet and the height of the moving column is about 10 feet. A fixed center column 27 is provided within the tank as seen in FIG. 1. Normally center column 27 includes an extension 27a having a bottom flange 27b for bolting attachment to the bottom 11 of tank 10. A suitable field weld 27c connects the extension 27a to the factory-supplied center column section 27. Fixed column 27 has a peripheral top ledge 41 on which is mounted a first series of load points, such as sheave assemblies 40. A cross support member 37 is positioned at a lower portion of fixed column 27. Support beam 37 supports a lower support column 24 extending upwardly from inside column 27. Means, such as drum means 38, is provided for selectively pulling in and paying out an elongate flexible tension member, such as cable 39. The drum 38 is connected to beam 37 by drum support base 61 and upper support 35 and driven by reducer 48 through a chain drive 49. For clarity a motor is not shown. Sheave assembly 40 includes a sheave from which depends a generally vertical span of the cable 39 in the annulus formed between fixed column 27 and a telescoping inner movable column 28. Ledge 41 on top of column 27 supports a series of load sheaves 40 in each quadrant of its circular periphery. Internal ledge 44 of the movable column 28 supports a second series of lift points, such as sheaves 53, 54 and 55, in each of its respective quadrants around the internal periphery. The exit and entrance portions of each of the sheaves extend in the annulus 45 between the fixed column 27 and movable column 28.

Cable 39 is threaded from an upper load sheave to a lower lift sheave to an upper sheave to a lower sheave, etc. as one proceeds around the periphery of the two columns. The ends of the continuous cable are passed through feed sheaves 42 and attached to drum 38. The cable ends 46, 47 come of the two feed sheaves 42 appropriately positioned to the drum, and are wrapped on the rotating vertical drum surface in parallelism. As the respective ends 46, 47 of the cable 39 are wrapped on the drum surface, the overall cable length between the sets of sheaves becomes shortened, and the span between the upper and lower series of sheaves is also shortened. The lower cable sheave assemblies 53, 54 and 55 and the movable column 28 to which they are attached are raised with respect to the vertically fixed drum surface and thus lay down two helical lays of cable in side-by-side parallelism as the movalbe column 28 proceeds upwardly. Thus, when the movable column 28 is in the fully up position, in a typical application there will be upwards of 17 wraps of cable around the periphery of the vertical drum surface.

When it is desired to lower the movable column 28 and its associated rake holding arms and drive structure, the lift motor is reversed and the wraps of cable are payed off the drum surface each lay after the other as the movable column 28 proceeds downwardly. In both up and down movement the array of sheave assemblies particularly feed sheaves 42 are juxtaposed to the position on the drum where the cable is being payed off the drum surface onto such sheaves.

The movable column 28 is guided in its up and down movement by spaced multiple keys 60 extending vertically on the outside periphery of the moving column 28 which pass through key guideways attached to the inner periphery of the fixed column 27. A guideway casing 51 surrounds the guideway and a lubrication fitting 52 is provided to lubricate the key and keyway. A lubricant supply tube 59 is attached to each of the lube ports 52

Grating 67 is provided on an upper inner ledge and lower inner ledge of column 28 which allows access to ladder 36 and affords safety to those workmen and operators in the vicinity of the rake arm drive and the lift drum drive. A suitable annular splash plate 68 depends from the flange 30 exterior to both of the columns 27 and 28 to prevent ingress of liquid into the area of the sheaves 40 and the upper guideways.

FIG. 3 shows four keys 60 and guideways 50 at 90, spacing around the periphery of the respective fixed column 27 and movable column 28. Interposed between each key and keyway combination are the first series of load sheaves, for example, sheaves 40, which extend in the annulus 34 between the inner and outer columns 28 and 27. It is to be noted that directly above the three lift sheave assemblies 53, 54 and 55 are four load sheave assemblies 40 located in each quadrant which allow for the complete threading of the cable between the various sets of sheave assemblies and provide uniform load distribution on columns 27 and 28. In such arrangement, assembly 53 and 55 each have two sheaves on a bracket and assembly 54 has one sheave. This is similar to the schematic of FIG. 8 wherein sheaves 4a-d correspond to load sheaves 40 and 5a and 3a correspond to dual lift sheave assembly 53 and sheave 5b represents lift sheave 54. FIG. 3 shows drum 38 receiving cable ends 46 and 47 in the same rotary direction so that the respective cable ends are laid down in side-by-side parallel relationship to each other on the drum surface. Upper bearing mount 35 of drum 38 may be attached to support column 24. Extending between the shown two support columns 24 is an access ladder 36 which extends from above the top of the ring gear unit 16 to the bottom support 37 of the fixed column 27. Limit stops 62 and 63 are provided on the column 24 which is actuatable at the extremes of the up and down positions of the ledge 44 of the movable column 28. Drum sprocket 64 connected to reducer 48 drives chain 49 which in turn drives a sprocket wheel 64a on drum 38.

FIG. 4 shows ladder 36 extending from support column 24 and illustrates top and bottom limit switches 62 and 63, respectively, extending from the support column 24. Actuation of top limit switch 62 by the upper edge of ledge 44 of movable column 28 deactuates the motor and stops drum rotation leaving the movable column 28 in the up position. Likewise, actuation of the lower limit switch 63 by the bottom edge of ledge 44 deactuates the motor and stops drum 38 in the down position. To prevent further downward movement in event of limit switch failure causing actual contact of the rakes with the tank bottom a positive lower mechanical stop 66 is provided extending from support beam 37 upwardly to a position just below lower limit stop 63.

FIG. 5 is a alternative embodiment of the lift device particularly useful in thickeners of so-called intermediate size, namely those having outside diameters of from 60 to 100 feet. These devices employ a lifting horsepower of from 0.75 to about 2.0 and can lift upwards of 200,000 pounds. In an 84-foot diameter device of this embodiment, the fixed column has a diameter of approximately five feet and the height of the moving column is approximately 9 feet. In FIG. 5 the sheave assemblies are provided above the top of fixed column 70 rather than oriented within the annulus between the fixed and moving columns as in FIG. 2. This permits an appreciably smaller diameter fixed column 70 affording greater useful tank capacity. Column 70 has a downward extension 71 joined by field weld 72. Flange 27 of extension 71 is attached to the bottom of the sedimentation tank as explained with respect to FIG. 2.

Fixed column 70 has an outwardly extending peripheral flange 73 which supports a flange 74 of a keyway housing. A keyway 79 is provided through which slides key 78 attached to the outside periphery of telescoping column 75. Key 78 slides through keyway 79 at the upper portion of column 70 and a lower guide 69 at a lower portion of column 70, mounted to a bottom flange 76 of movable column 75. Suitable lubrication means 80 are provided to lubricate the key and keyway within each housing. Lubrication means 77 lubricates lower guide 69 against the inner wall of column 70.

Drive unit 82 is positioned on an outwardly extending peripheral ledge 81 extending from the top of column 75. Drive unit 82 rotates depending torque cage 14 which supports the rake arms as seen in FIG. 1. A splash shield 68 may also be provided in this embodiment. Support column 24 extends from an internal horizonal support member adjacent the bottom of the fixed column 70 adjacent to the field weld 72 position.

Post 24 contains an upward extension 100 including a bridge-mounting crossbeam 102 extending above the drive unit 82. Upper load sheave assemblies 101 are positioned on a horizontal circular plate at the top of the bridge and support column extension 100 and comprises a series of sheaves 88, 89 and 90 depending from the plate periphery. Cable spans 86 and 87 extend from sheaves 88-90 to lower lift sheave assemblies containing dual sheaves 84, 85 mounted on an inner ledge 83 below the upper extremity of telescoping column 75.

After being threaded through sheaves 88, 85, 89, etc., and back to sheave 90 at the top, cable ends 103 and 104 are passed into a fixed (nonrising) idler sheave assembly 92 containing upper and lower idler sheaves 93 and 94. Cable end passes through sheave 93 where it is wound on the surface of the drum 97. Cable end 104 passes around idler sheave 94 and is connected to a feed idler sheave 95 on the opposite side of drum 97 where the cable end 104 is wound next to and parallel to cable end 103. As drum 97 is rotated, the overall cable spans 86 and 87 are shortened between the upper and lower sets of sheaves resulting in an upward movement of column 75 and the drum 97 so that succeeding layers of cable 103 and 104 are wound on the cable drum in positions lower than the preceding turns on the drum as the telescoping column is moved upwardly with respect to fixed column 70.

Drive reducer 99 drives chain 98 which in turn rotates drum 97. Drum 97 and its associated drive means are mounted on a pair of brackets 106 and 108 extending outwardly from vertical bracket 105 which extends upwardly from flange 81 on the telescoping column 75.

FIG. 6 taken on the line 6—6 of FIG. 5 looking downwardly at the top end of the cable-lifting mechanism and the associated drum 97 shows cable end 103 being fed from idler sheave 93 to the drum surface in parallelism with cable end 104 which enters the drum surface of drum 97 from idler sheaves 94 and 95. Sheave 93 is part of idler assembly 92 situated between the post extension 100 and the vertical drum 97. Double sheaves 83 and 84 are provided so as to provide apportionment of the loading over a greater number of sheaves in the limited linear spacing around the periphery of the smaller movable column 75 and to fit 8 sheaves in the space available and have them located directly below the sheaves above them from which they receive and send cable. A shield 109 is provided around the cable spans 86 and 87 and the other cable spans between the respective upper and lower sheave assemblies so as to protect from ingress of moisture and contaminants and to guard against accidents to operating personnel.

FIG. 7 is a detailed view of a typical sheave assembly used with this invention. A sheave 110 is rotatively mounted on a hardened shaft 111 and rotates on a roller bearing 112 between the inner periphery of the sheave bore and the outside diameter of the shaft 111. A retainer pin 113 retains the sheave in position on the shaft. The grease fitting 114 with a suitable internal passageway is provided for lubricating the roller bearing. A grease retainer 115 seals the roller bearing ends and the peripheral edges of sheave 110. A cable shield 116 surrounds the sheave 110 except for ingress and egress apertures allowing for threading and inward and outward movement of the cable. A suitable support bracket 117 is mounted to the particular ledge of either the fixed or movable columns of the invention.

FIG. 8 is a schematic view of the threading of the cable through the upper and lower series of sheaves. Pull of the cable is provided at points 1 and 2 by the drum shown in the previous Figures. Cable ends 1 and 2 are connected to one end of the drum surface. Cable end 1 passes over idler sheave 3a, progresses to upper sheave 4a, passes downward to sheave 5a of the lower set of sheaves, returns upwardly to another upper sheave 4b and back down to a lower sheave 5b. Again, the cable moves upwardly to an upper sheave 4c, then proceeds to a lower sheave 5c and then to an upper sheave 4d and downwardly again to idler sheave 3b where it is now cable end 2. Rotation of the drum to wind up ends 1 and 2 thereon effects shortening of the cable spans between the fixed upper series of sheaves 4a, 4b, 4c and 4d and the lower series of sheaves 5a, 5b, 5c, 3a and 3b such that the lower span of sheaves affixed to member 6 are moved upwardly towards the upper series of sheaves held by fixed member 7. Since the lower set of sheaves 5a–5c, as explained with regard to FIGS. 2 and 5, are contained on the movable column, the movable column thus moves upwardly and lifts the rake structures attached to such moving column.

It is to be understood that the ring gear in each of the modifications may take different forms in relation to its attachment to the torque cage 14. The ring gear functions to rotate the rake arms so that blades on the arms move sediments towards the sludge pockets in tank 10. Rotary movement of the torque cage 14 and the attached rake arms 17 are independent from the raising and lowering of the columns with respect to each other and the attendant raising and lowering of the drive units and attached torque cage and rake arms.

While the elongate flexible tension member has been shown and described as a cable, it is contemplated that this member may also be a link chain, a bead chain, or other suitable type of tension member. Similarly, while the load and lift points have been shown and described as sheaves, it is contemplated that these points may constitute sprockets or the like rotatably mounted on the columns, or generally horizontal projections on the columns past which the tension member may slide and to which vertical forces may be applied by the tension member. Lastly, while the means for pulling in and paying out the tension member is shown and described as a drum, this means may also be a sprocket, a pair of cooperating rolls, a series of rolls or other suitable means.

The above description of embodiments of this invention is intended to be illustrative and not limiting. Other embodiments of this invention will be obvious to those skilled in the art in view of the above disclosure.

We claim:

1. A lifting mechanism for a raking structure in a solids-liquid separation tank comprising:
   a fixed column adapted to extend vertically within the tank;
   a movable column in telescoping relationship with said fixed column, said movable column being adapted to support a raking structure for the tank;
   means for raising and lowering said movable column telescopically with respect to said fixed column comprising;
   an elongate flexible tension member;
   a first series of load points on the fixed column at spaced intervals on the fixed column;
   a second series of lift points on the movable column below said first series of points and at spaced intervals on the movable column, the tension member being alternately threaded between load and lift points of said first and second series of points, with the tension member thus being led over one of said load points, down and below one of said lift points and back up and over the next load point; and
   means for selectively pulling and paying out said tension member for drawing the lift points up toward the load points for raising the movable column, and for allowing the lift points to move down away from the load points for lowering the movable column, respectively.

2. A lifting mechanism as set forth in claim 1 comprising a plurality of sheaves rotatably mounted on the fixed column and constituting said load points.

3. A lifting mechanism as set forth in claim 2 comprising a plurality of sheaves rotatably mounted on the movable column and constituting said lift points.

4. A lifting mechanism as set forth in claim 3 wherein the elongate flexible tension member is a cable.

5. A lifting mechanism as set forth in claim 1 wherein the means for selectively pulling and paying out the tension member comprises drum means.

6. A lifting mechanism as set forth in claim 5 wherein the drum means is rotatably mounted on one of said columns.

7. A lifting mechanism as set forth in claim 1 wherein the portions of the columns in engagement upon telescoping movement thereof are of complementary non-circular section for preventing relative rotation of the columns.

8. A lifting mechanism as set forth in claim 7 comprising a key and keyway on the engaging portions of the columns to prevent relative rotation thereof.

9. A lifting mechanism as set forth in claim 1 wherein a portion of the movable column is received within the fixed column, with said series of lift points being positioned adjacent the lower end of said portion of the movable column.

10. A lifting mechanism as set forth in claim 1 wherein the movable column is exterior to and carried on the fixed column.

* * * * *